May 6, 1941.                T. W. MILLER                2,240,711
                            VALVE OR COCK
                         Filed April 19, 1940

INVENTOR:
TREVLYN WHITTAL MILLER
BY:
Francis E. Boyce
ATTORNEY

Patented May 6, 1941

2,240,711

UNITED STATES PATENT OFFICE 2,240,711

VALVE OR COCK

Trevlyn Whittal Miller, Parkview, Johannesburg, Transvaal, South Africa

Application April 19, 1940, Serial No. 330,492. In the Union of South Africa November 15, 1939

3 Claims. (Cl. 251—156)

This invention relates to valves or cocks for controlling or restricting the flow of fluids, and, in particular, to valves for use in mines or such like places where they are liable to encounter grit and be subjected to rough usage.

The object of the invention is to provide a simple and efficient valve or cock, economical to produce, having few joints and with easily replaceable robust parts; also one which requires the minimum amount of machining for its production. Another object is to provide a valve which is easy to operate, efficient in service even when grit and corrosive substances are encountered.

The invention provides a valve having a circular wall of rubber or other resilient material, a plug, of the well known butterfly shape, adapted to be rotated on an axis at right angles to the bore of the valve, a casing providing rigidity and strength, and means for connecting the valve in position for use. The wings of the butterfly valve form the plug which in its closed position blocks the passage conducting the fluid. On rotating the plug through an angle of 90° the fluid passage opens and there is presented to the flow of fluid the edge of the wings. Heretofore in butterfly valves a fluid tight seating around the plug has only been obtained by carefully shaping and fitting the parts. With this invention the need of care in fitting is avoided and consequently this type of valve can be used where grit or the like is encountered.

A preferred form of the invention is illustrated in the accompanying drawing in which.

Figure 1:
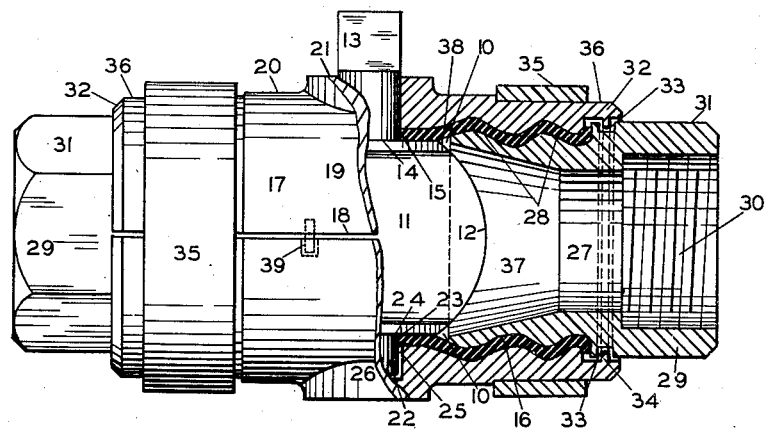
Fig. 1 is a side view with parts cut away.
Figure 2:
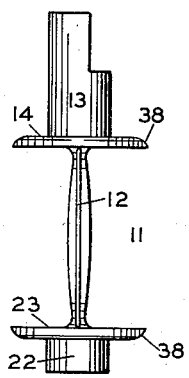
Fig. 2 is a side elevation of the plug when turned 90° from its position in Fig. 1; and, Fig. 3 is a modification of the part shown in Fig. 2.

The walls of the passageway 10 through the valve consists of a length of resilient hose. For instance a tube of rubber or the like, usually reinforced with fabric. The disc shaped plug 11 may be of metal having rounded edges 12 giving it a somewhat streamline shape when viewed edgewise as in Fig. 2. It is provided with a projecting spindle 13 having a collar 14 spreading at right angles to the face of the disc.

A hole 15 is made in the wall of the hose to accommodate the short projecting spindle 13. It will be understood that a plug member such as described may be placed in position by flattening the hose 16, pushing it into position and the spindle 13 through the hole 15. The wall of the hose around the hole 15 rests on the collar 14 to make a joint therewith.

In order to maintain the hose 16 in proper shape a cylindrical casing 17 of metal or other suitable rigid material is provided. It is split longitudinally at 18 to divide the cylinder into two halves. The one half 19 has its wall 20 bored to fit the plug spindle 13. This part of the cylinder wall may be thickened with a suitable nipple 21 to provide a bearing for the spindle 13.

Usually, and as shown, the plug 11 has a short projecting spindle 22 diametrically opposite 13. Said spindle 22 also has a collar 23. Spindle 22 is passed through a second hole 24 in the resilient tube and is accommodated in a suitable recess 25 in the second half 26 of the split casing 17.

Each end of the hose 16 is provided with a ring or short tube 27 entering the bore of the hose 16 to keep it expanded against the internal wall of the casing 17. Circumferential grooves and ridges, as shown at 28, may be formed externally of 27 and corresponding grooves are made internally of casing 17, between said grooves the hose 16 is clamped, as hereafter described.

Suitable means for attaching the valve to a pipe line are provided. In the design illustrated the tubular part 27 is provided with an extension 29 screw threaded internally at 30 and externally shaped as an hexagon 31.

To prevent the part 27 twisting in the hose 16 the cylindrical casing 17 is suitably shaped at its ends 32 to overlap and engage the hexagonal portion 31 to prevent it rotating therein.

In some cases and as shown in the drawing the part 27 is held against longitudinal displacement by providing a groove 33 into which an internal flange, or lugs 34, on the ends of casing 17, project.

The two parts of the casing 17 are held together by bands 35. The cylindrical surfaces 36 of the casing 17 are tapered slightly outwardly so that when the bands 35 are forced into position the two halves of the casing 17 are brought together.

The parts 27 have their bore 37 flared outwardly to avoid obstruction of the passage of fluid through the valve.

It will be understood that the collars 14 afford a surface making a tight joint around the spindles 13 and 22 by pressure of the resilient wall 16 between 14 and 23 and the casing 17. The outside edges of the discs 14 and 23 are well rounded to prevent cutting into the resilient walls.

It will be seen, on reference to the drawing, the resilient tube 10 not only co-operates with the plug 11 in making a closure of the bore of the valve but the same resilient tube at 16 forms a joint to prevent leakage between the valve and its connecting means 27, 29, to the fluid circuit.

Dowels 39 may be provided in the adjoining surfaces 18 of the casing 17 to register properly the two halves.

Figure 3:
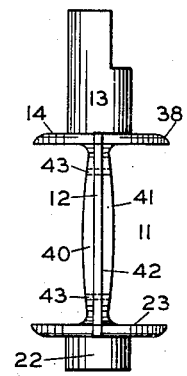

In some constructions (see Fig. 3) especially in large valves, the plug 11 may have the wings and collars 14 and 23 made in two parts 40, 41, with a resilient disc 42 between them. This disc 42 provides a resilient edge practically all round the plug to assist in making a tight joint when the valve is closed. The parts 40, 41, are held together by the rivets or screws 43.

The valve has been described and illustrated in its most simple form. Other forms may provide alternative means for attaching the valve to the pipe line and for holding the two halves 19, 26, of the casing 17 together.

It will be understood that with this type of valve and with the valve member in its closed position the seating or joint making faces of the plug are protected from corrosion since the circular edge 12 of the plug 11 is embedded in the rubber, or rubberized fabric, wall 10.

What I claim as new and desire to secure by Letters Patent is:

1. A valve for controlling the flow of fluids comprising a resilient tube forming a tubular wall for a valve member, a rotatable spindle piercing the tube diametrically, a rigid valve disc fitting the bore of the tube and secured to the spindle, a split rigid cylindrical casing surrounding the tube, fastening means for holding together the parts of the casing, a bearing in each of the two parts of the casing for one end of the rotatable spindle, two collars each coaxial with the spindle and secured thereto between the valve disc and each of the bearings of the spindle said collars forming with the resilient wall fluid tight joints around the spindle where it pierces the tubular wall.

2. A valve for controlling the flow of fluids comprising a resilient tube forming a tubular wall for a valve member, a rotatable spindle piercing the tube diametrically, a rigid valve disc fitting the bore of the tube and secured to the spindle, a split rigid cylindrical casing surrounding the tube, fastening means for holding together the parts of the casing, a bearing in each of the two parts of the casing for one end of the rotatable spindle, two collars each coaxial with the spindle and secured thereto between the valve disc and each of the bearings of the spindle said collars forming with the resilient wall fluid tight joints around the spindle where it pierces the tubular wall, spigots inserted into the ends of the tube, indentations on the exterior of said spigots corresponding to ridges on the internal surface of the casing with the resilient wall gripped between them.

3. A valve for controlling the flow of fluids comprising a resilient tube forming a tubular wall for a valve member, a rotatable spindle piercing the tube diametrically, a rigid valve disc fitting the bore of the tube and secured to the spindle, a split rigid cylindrical casing surrounding the tube, fastening means for holding together the parts of the casing, a bearing in each of the two parts of the casing for one end of the rotatable spindle, two collars each coaxial with the spindle and secured thereto between the valve disc and each of the bearings of the spindle said collars forming, with the resilient wall, fluid tight joints around the spindle where it pierces the tubular wall, spigots inserted into the ends of the tube, indentations on the exterior of said spigots corresponding to ridges on the internal surface of the casing with the resilient wall gripped between them, the ends of the casing and the exterior of the ends of the spigots provided with co-operating surfaces to lock these parts together on assembly.

TREVLYN WHITTAL MILLER.